United States Patent
Liu et al.

(10) Patent No.: US 9,445,286 B2
(45) Date of Patent: Sep. 13, 2016

(54) PROTOCOL VERSION NEGOTIATION METHOD, MOBILE TERMINAL, BASE STATION AND COMMUNICATIONS SYSTEM

(71) Applicant: HUAWEI TECHNOLOGIES CO., LTD., Shenzhen, Guangdong (CN)

(72) Inventors: Tao Liu, Beijing (CN); Lei Han, Beijing (CN); Shangfeng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 14/065,764

(22) Filed: Oct. 29, 2013

(65) Prior Publication Data

US 2014/0187224 A1 Jul. 3, 2014

(30) Foreign Application Priority Data

Dec. 31, 2012 (CN) .......................... 2012 1 0591821

(51) Int. Cl.
    H04M 3/00 (2006.01)
    H04W 24/02 (2009.01)
    H04W 8/24 (2009.01)
    H04L 29/06 (2006.01)

(52) U.S. Cl.
    CPC .............. *H04W 24/02* (2013.01); *H04L 69/24* (2013.01); *H04W 8/24* (2013.01)

(58) Field of Classification Search
    None
    See application file for complete search history.

(56) References Cited

U.S. PATENT DOCUMENTS

| 7,466,659 B1 * | 12/2008 | Kazar et al. | 370/252 |
| 2006/0282545 A1 * | 12/2006 | Arwe et al. | 709/237 |
| 2009/0233620 A1 * | 9/2009 | Fischer et al. | 455/456.1 |

FOREIGN PATENT DOCUMENTS

CN 101668315 3/2010

OTHER PUBLICATIONS

Chinese Office Action dated Jan. 15, 2015 in corresponding Chinese Patent Application No. 201210591821.8.
*3rd Generation Partnership Project; Technical Specification Group Radio Access Network; Evolved Universal Terrestrial Radio Access (E-UTRA); Radio Resource Control (RRC); Protocol specification (Release 9).* 3GPP Organizational Partners. 3GPP TS 36.331 V9.4.0 (Sep. 2010): Technical Specification. Valbonne, France, 2010. pp. 1-252.

* cited by examiner

*Primary Examiner* — Erika Washington
(74) *Attorney, Agent, or Firm* — Staas & Halsey LLP

(57) ABSTRACT

The present invention discloses a protocol version negotiation method, a mobile terminal and a base station. The method includes: receiving, by a mobile terminal, an air interface message sent by a base station according to a 3GPP protocol, where the air interface message includes an information element for indicating a highest protocol version supported by the base station, and the air interface message is sent before the base station sends a request message for querying the mobile terminal capability set; obtaining the highest protocol version supported by the base station according to the information element; and if the highest protocol version supported by the mobile terminal is later than the highest protocol version supported by the base station, configuring, by the mobile terminal, a protocol version used by the mobile terminal to a protocol version same as the highest protocol version supported by the base station.

12 Claims, 10 Drawing Sheets

PROTOCOL VERSION NEGOTIATION METHOD, MOBILE TERMINAL, BASE STATION AND COMMUNICATIONS SYSTEM

CROSS-REFERENCE TO RELATED APPLICATIONS

This application claims priority to Chinese Patent Application No. 201210591821.8, filed on Dec. 31, 2012, which is hereby incorporated by reference in its entirety.

TECHNICAL FIELD

The present invention relates to the communications field, and in particular, to a protocol version negotiation method, a mobile terminal, a base station, and a communications system.

BACKGROUND

LTE (Long Term Evolution, Long Term Evolution) is a 3GPP (The 3rd Generation Partnership Project, the 3rd Generation Partnership Project) standard, and is considered as a mainstream technology of evolution from the 3G (3rd-generation, the 3rd-generation mobile communications technology) to the 4G (4th-generation, the 4th-generation mobile communications technology). The LTE system standard includes multiple protocol versions such as Release 8 and Release 9. Different protocol versions vary greatly in communications features and specifications. Therefore, the mobile terminal needs to notify a network of the supported protocol version.

According to the 3GPP 36331 protocol, in the process of a mobile terminal accessing a network, a base station sends a request to the mobile terminal to query a mobile terminal capability set, where the mobile terminal capability set includes the highest protocol version number supported by the mobile terminal; the base station receives the mobile terminal capability set reported by the mobile terminal; and the base station obtains the highest protocol version supported by the mobile terminal from the mobile terminal capability set, and ensures compatibility with the mobile terminal.

In the process of implementing the present invention, the inventor finds at least the following problems in the prior art:

After the mobile terminal reports the supported highest protocol version by using the mobile terminal capability set, if the highest protocol version supported by the mobile terminal is later than the highest protocol version supported by the base station, the base station is unable to obtain the highest protocol version supported by the mobile terminal according to the mobile terminal capability set, and unable to ensure compatibility with the mobile terminal, which leads to a compatibility problem in the process of interconnection between the mobile terminal and the base station or even leads to disastrous consequences.

SUMMARY

To solve the problem in the prior art, that is, a compatibility problem occurs in the process of interconnection between a mobile terminal and a base station, embodiments of the present invention provide a protocol version negotiation method, a mobile terminal, a base station, and a communications system. The technical solutions are as follows:

In one aspect, an embodiment of the present invention provides a protocol version negotiation method, where the method includes:

receiving, by a mobile terminal, an air interface message sent by a base station according to a 3rd Generation Partnership Project protocol, where the air interface message includes an information element for indicating a highest protocol version supported by the base station, and the air interface message is sent before the base station sends a request message for querying a mobile terminal capability set;

obtaining the highest protocol version supported by the base station according to the information element;

determining whether the highest protocol version supported by the mobile terminal is later than the highest protocol version supported by the base station; and if the highest protocol version supported by the mobile terminal is later than the highest protocol version supported by the base station, configuring, by the mobile terminal, a protocol version used by the mobile terminal to a protocol version same as the highest protocol version supported by the base station.

Optionally, the air interface message is a system message, the information element is a non-critical extension information element in the system message, and a predetermined bit in the non-critical extension information element is used to indicate the highest protocol version number supported by the base station;

or the air interface message is a master information block system message, the information element is an information element of reserved bits in the master information block system message, and a predetermined bit in the information element of the reserved bits is used to indicate the highest protocol version number supported by the base station; and therefore, the obtaining the highest protocol version supported by the base station according to the information element includes:

reading the highest protocol version number supported by the base station from the non-critical extension information element or the information element of the reserved bits.

Optionally, the information element is a specific information element of each protocol version in the air interface message; and therefore, the obtaining the highest protocol version supported by the base station according to the information element includes:

searching in the air interface message to check whether the specific information element exists, and, if the specific information element exists, using the highest protocol version in protocol versions corresponding to all existent specific information elements as the highest protocol version supported by the base station.

Optionally, the method further includes:

receiving the request message for querying the mobile terminal capability set sent by the base station; and reporting a mobile terminal capability set to the base station, where the mobile terminal capability set includes the protocol version number used by the mobile terminal.

In another aspect, an embodiment of the present invention further provides a protocol version negotiation method, where the method includes:

sending, by a base station before sending a request message for querying a mobile terminal capability set, an air interface message to a mobile terminal according to a 3rd Generation Partnership Project protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

Optionally, the sending, by a base station before sending a request message for querying the mobile terminal capability set, an air interface message to a mobile terminal according to a 3rd Generation Partnership Project protocol, where the air interface message includes an information element for indicating a highest protocol version supported by the base station, includes:

sending, by the base station, the air interface message to the mobile terminal, where the air interface message is a system message, the information element is a non-critical extension information element in the system message, and a predetermined bit in the non-critical extension information element is used to indicate the highest protocol version number supported by the base station; or sending, by the base station, the air interface message to the mobile terminal, where the air interface message is a master information block system message, the information element is an information element of reserved bits in the master information block system message, and a predetermined bit in the information element of the reserved bits is used to indicate the highest protocol version number supported by the base station.

In another aspect, an embodiment of the present invention further provides a mobile terminal, where the mobile terminal includes:

a receiving module, configured to receive an air interface message sent by a base station according to a 3rd Generation Partnership Project protocol, where the air interface message includes an information element for indicating a highest protocol version supported by the base station, and the air interface message is sent before the base station sends a request message for querying a mobile terminal capability set;

an obtaining module, configured to obtain the highest protocol version supported by the base station according to the information element in the air interface message received by the receiving module;

a determining module, configured to determine whether the highest protocol version supported by the mobile terminal is later than the highest protocol version supported by the base station that is obtained by the obtaining module; and a mobile terminal configuring module, configured to: if a determination result of the determining module is that the highest protocol version supported by the mobile terminal is later than the highest protocol version supported by the base station, configure a protocol version used by the mobile terminal to a protocol version same as the highest protocol version supported by the base station.

Optionally, the air interface message is a system message, the information element is a non-critical extension information element in the system message, and a predetermined bit in the non-critical extension information element is used to indicate the highest protocol version supported by the base station; or the air interface message is a master information block system message, the information element is an information element of reserved bits in the master information block system message, and a predetermined bit in the information element of the reserved bits is used to indicate the highest protocol version supported by the base station; and therefore, the obtaining module is configured to:
read the highest protocol version supported by the base station from the non-critical extension information element or the information element of the reserved bits.

Optionally, the information element is a specific information element of each protocol version in the air interface message; and therefore, the obtaining module is configured to:
search in the air interface message to check whether the specific information element exists, and, if the specific information element exists in the air interface message, use the highest protocol version in protocol versions corresponding to all existent specific information elements as the highest protocol version supported by the base station.

Optionally, the receiving module is further configured to receive the request message for querying the mobile terminal capability set sent by the base station; and correspondingly, the mobile terminal further includes:
a reporting module, configured to report a mobile terminal capability set to the base station, where the mobile terminal capability set includes the protocol version number used by the mobile terminal.

In another aspect, an embodiment of the present invention further provides a base station, where the base station includes:

a sending module, configured to: before sending a request message for querying a mobile terminal capability set, send an air interface message to a mobile terminal according to a 3rd Generation Partnership Project protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

Optionally, the sending module is configured to:
send the air interface message to the mobile terminal, where the air interface message is a system message, the information element is a non-critical extension information element in the system message, and a predetermined bit in the non-critical extension information element is used to indicate the highest protocol version supported by the base station; or send the air interface message to the mobile terminal, where the air interface message is a master information block system message, the information element is an information element of reserved bits in the master information block system message, and a predetermined bit in the information element of the reserved bits is used to indicate the highest protocol version supported by the base station.

In another aspect, an embodiment of the present invention further provides a communications system, where the system includes the mobile terminal and the base station.

The technical solutions provided in the embodiments of the present invention bring the following beneficial effects:

Before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Embodiment 1

Figure 1:
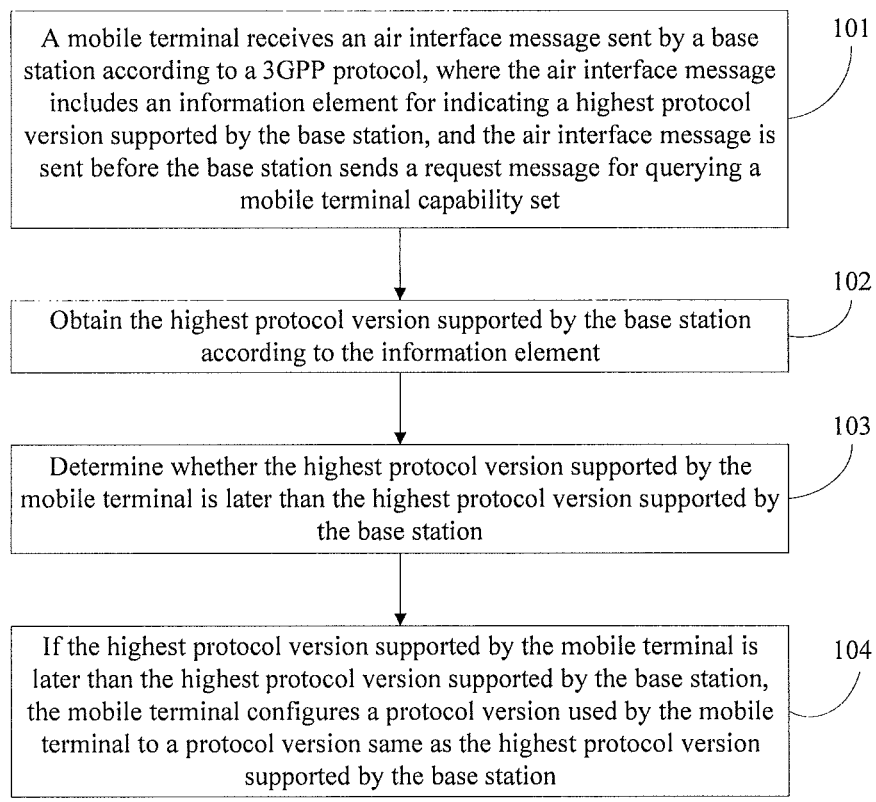
FIG. 1 is a flowchart of a protocol version negotiation method according to Embodiment 1 of the present invention.

Embodiment 1 of the present invention provides a protocol version negotiation method. As shown in FIG. 1, the method includes:

Step 101: A mobile terminal receives an air interface message sent by a base station according to a 3GPP protocol, where the air interface message includes an information element for indicating a highest protocol version supported by the base station, and the air interface message is sent before the base station sends a request message for querying a mobile terminal capability set.

In the 3GPP protocol, the air interface message refers to all messages in general sent to the mobile terminal, where the message include a system message, a master information block system message, and other air interface messages.

Step 102: Obtain the highest protocol version supported by the base station according to the information element.

Step 103: Determine whether the highest protocol version supported by the mobile terminal is later than the highest protocol version supported by the base station.

Step 104: If the highest protocol version supported by the mobile terminal is later than the highest protocol version supported by the base station, the mobile terminal configures a protocol version used by the mobile terminal to a protocol version same as the highest protocol version supported by the base station.

Evidently, if the highest protocol version supported by the mobile terminal is not later than the highest protocol version supported by the base station, because a later protocol version is compatible with an earlier protocol version but an earlier protocol version is not compatible with a later protocol version, the highest protocol version supported by the base station is compatible with the highest protocol version supported by the mobile terminal, and it is ensured that the base station is compatible with the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 2

Figure 2:
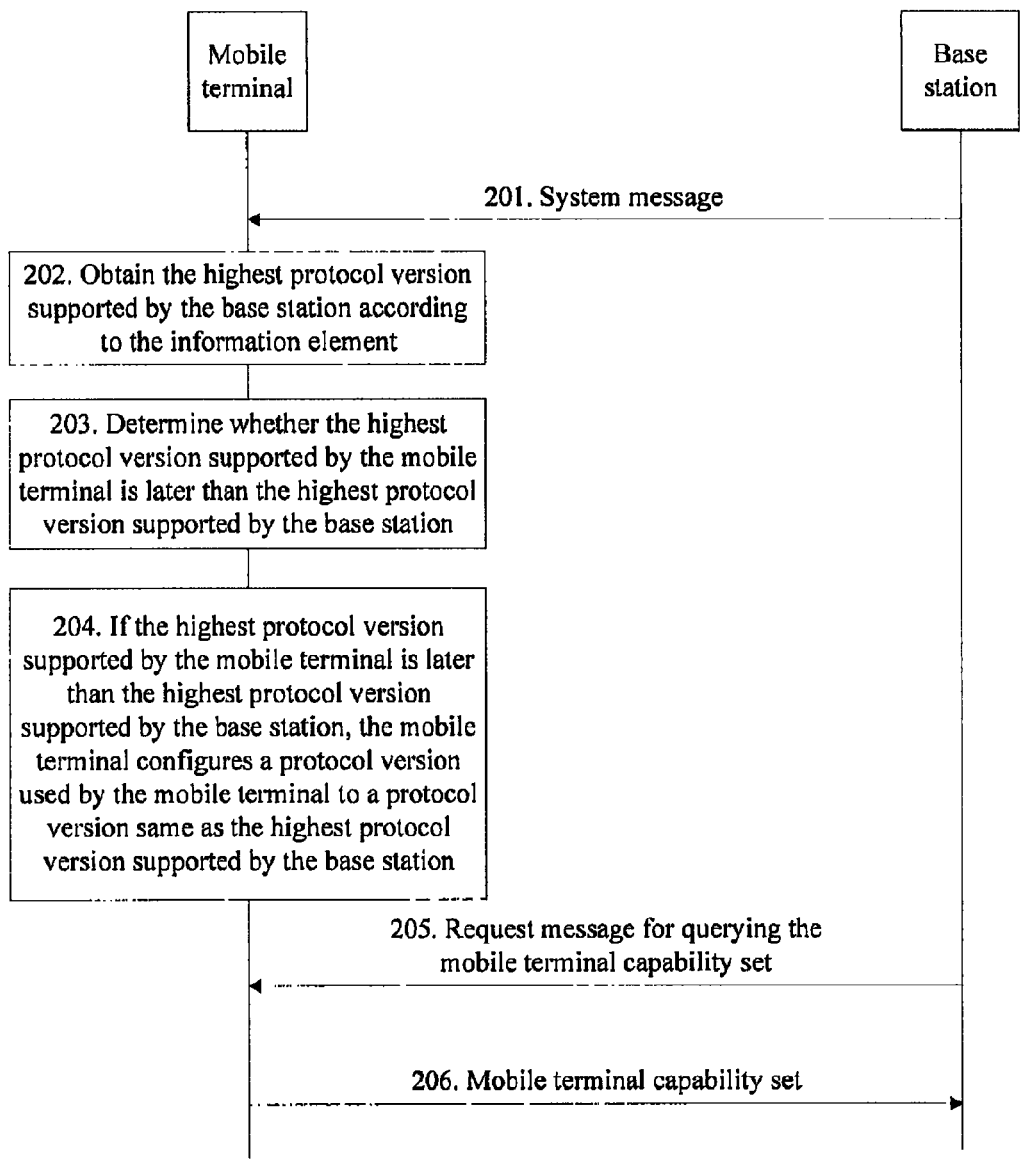
FIG. 2 is a flowchart of a protocol version negotiation method according to Embodiment 2 of the present invention.

Embodiment 2 of the present invention describes a protocol version negotiation method of the present invention by using a system message as an example of an air interface message. As shown in FIG. 2, the method includes the following steps:

Step 201: A mobile terminal receives an air interface message sent by a base station according to a 3GPP protocol, where the air interface message includes an information element for indicating a highest protocol version supported by the base station, and the air interface message is sent before the base station sends a request message for querying a mobile terminal capability set.

In this embodiment, the air interface message is a system message, such as system information block type 1 System Information Block Type1 and system information block type 2 System Information Block Type2 that must be received when the mobile terminal accesses a network. The information element is a non-critical extension information element non Critical Extension in the system message, and a predetermined bit in the non-critical extension information element non Critical Extension is used to indicate the highest protocol version supported by the base station.

Specifically, the size of the non-critical extension information element non Critical Extension may be in bits (bits), where m is set according to the number of protocol versions. It is assumed that the base station possibly supports n protocol versions, where n≤2$^k$, then m≥k. For example, the base station possibly supports 8 protocol versions, then m≥3. Using m=3 as an example, 000 may be used to represent Release 8, and 001 may be used to represent Release 9, and so on.

Step 202: Obtain the highest protocol version supported by the base station according to the information element.

Specifically, in this embodiment, the step 202 includes:
reading the highest protocol version supported by the base station from the non-critical extension information element non Critical Extension. For example, 000 indicates that the highest protocol version supported by the base station is Release 8, and 001 indicates that the highest protocol version supported by the base station is Release 9, and so on.

Step 203: Determine whether the highest protocol version supported by the mobile terminal is later than the highest protocol version supported by the base station.

Specifically, the highest protocol version supported by the mobile terminal is generally configured by a vendor before the mobile terminal is delivered. By reading the configuration, the mobile terminal learns the highest protocol version supported by the mobile terminal itself.

Step 204: If the highest protocol version supported by the mobile terminal is later than the highest protocol version supported by the base station, the mobile terminal configures a protocol version used by the mobile terminal to a protocol version same as the highest protocol version supported by the base station.

Specifically, by modifying its own configuration item, the mobile terminal configures the protocol version used by the mobile terminal to a protocol version same as the highest protocol version supported by the base station. After completing the configuration, the mobile terminal will not use function items beyond the highest protocol version currently supported by the base station.

Optionally, the method further includes the following steps:

Step 205: Receive the request message for querying the mobile terminal capability set sent by the base station.

Step 206: Report a mobile terminal capability set to the base station, where the mobile terminal capability set includes the protocol version used by the mobile terminal.

According to the received mobile terminal capability set, the base station decides how to schedule the mobile terminal to avoid a compatibility problem, which is covered in the prior art and is not detailed here any further.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 3

Figure 3:
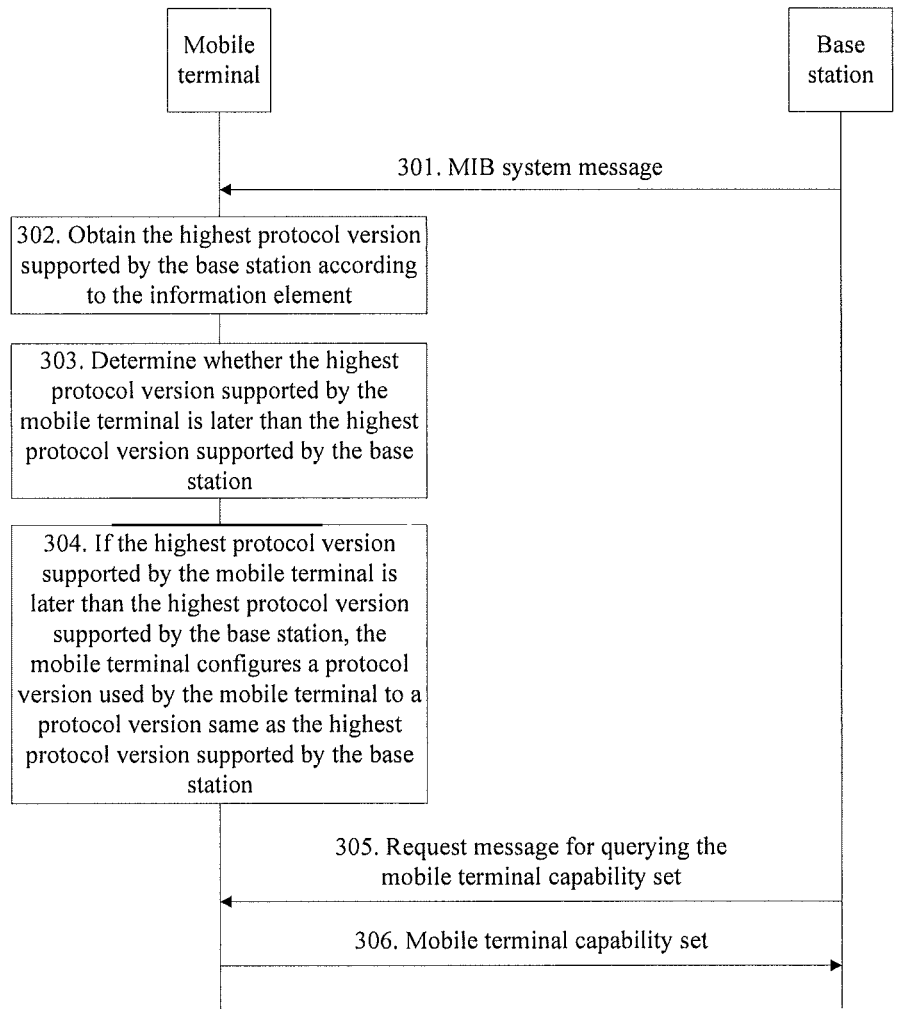
FIG. 3 is a flowchart of a protocol version negotiation method according to Embodiment 3 of the present invention.

Embodiment 3 of the present invention describes a protocol version negotiation method of the present invention by using an MIB (Master Information Block, master information block) system message as an example of an air interface message. As shown in FIG. 3, the method includes the following steps:

Step 301: A mobile terminal receives an air interface message sent by a base station according to a 3GPP protocol, where the air interface message includes an information element for indicating a highest protocol version supported by the base station, and the air interface message is sent before the base station sends a request message for querying a mobile terminal capability set.

In this embodiment, the air interface message is an MIB system message, the information element is an information element of reserved bits in the MIB system message, and a predetermined bit in the information element of the reserved bits is used to indicate the highest protocol version number supported by the base station. For example, in a reserved 10-bit Spare field in the MIB system message, the last three bits are used to indicate the highest protocol version number supported by the base station, 000 may be used to indicate Release 8, and 001 may be used to indicate Release 9, and so on.

Step 302: Obtain the highest protocol version supported by the base station according to the information element.

Specifically, in this embodiment, step 302 includes:
reading the highest protocol version number supported by the base station from the information element of the reserved bits, for example, 000 indicates that the highest protocol version supported by the base station is Release 8, and 001 indicates that the highest protocol version supported by the base station is Release 9, and so on.

Step 303: Determine whether the highest protocol version supported by the mobile terminal is later than the highest protocol version supported by the base station.

Step 304: If the highest protocol version supported by the mobile terminal is later than the highest protocol version supported by the base station, the mobile terminal configures a protocol version used by the mobile terminal to a protocol version same as the highest protocol version supported by the base station.

Optionally, the method further includes the following steps:

Step 305: Receive the request message for querying the mobile terminal capability set sent by the base station.

Step 306: Report a mobile terminal capability set to the base station, where the mobile terminal capability set includes the protocol version used by the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 4

Figure 4:
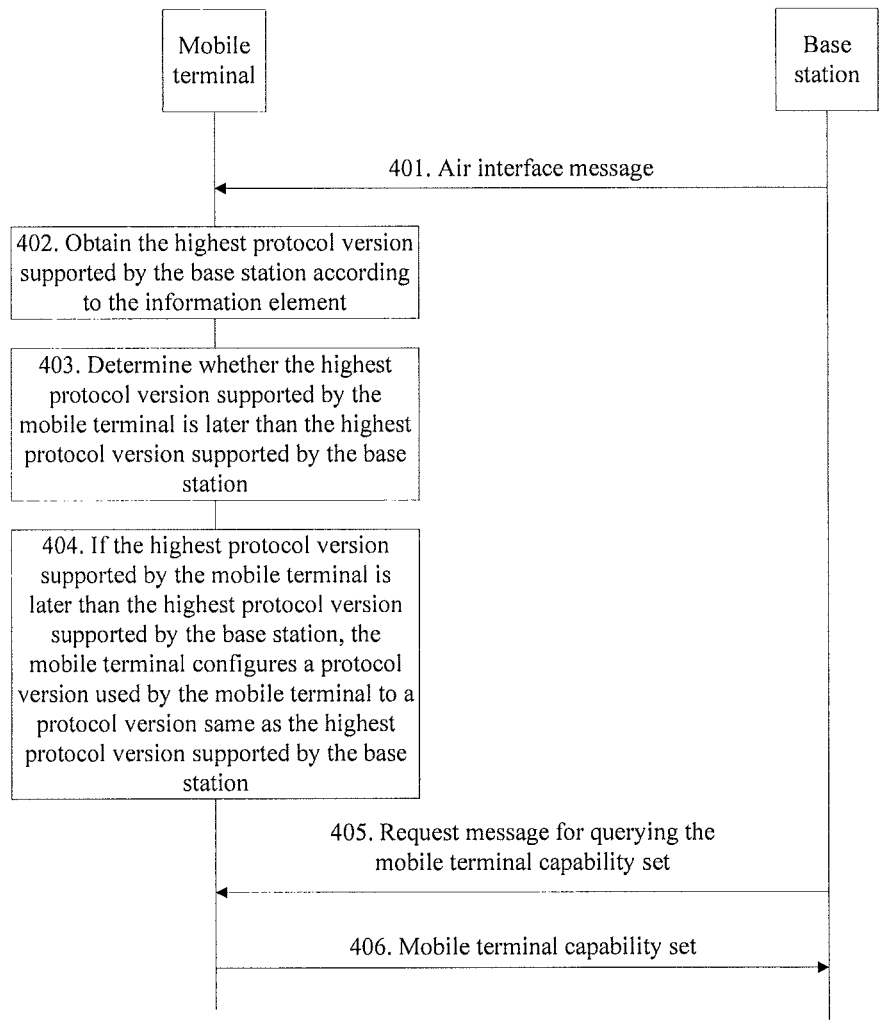
FIG. 4 is a flowchart of a protocol version negotiation method according to Embodiment 4 of the present invention.

Embodiment 4 of the present invention describes a protocol version negotiation method of the present invention by using an information element that is a specific information element of each protocol version in an air interface message as an example. As shown in FIG. 4, the method includes the following steps:

Step 401: A mobile terminal receives an air interface message sent by a base station according to a 3GPP protocol, where the air interface message includes an information element for indicating a highest protocol version supported by the base station, and the air interface message is sent before the base station sends a request message for querying a mobile terminal capability set.

In this embodiment, the air interface message may be a system message, such as system information block type 1 System Information Block Type1 that must be received by the mobile terminal when the mobile terminal accesses a network. The message may also be another air interface message in the 3GPP protocol, such as an RRC (Radio Resource Control, Radio Resource Control protocol) Connection Setup message, which is a parameter configuration message sent by the base station to the mobile terminal. The information element is a specific information element of each protocol version in the air interface message. For example, a Release 9 extension information element "cell Selection Info-v920" in a system information block type 1 System Information Block Type1, where the cell Selection Info-v920 information element indicates that the highest protocol version supported by the base station is at least Release 9. For another example, Release 9 information element "rlf-Timers And Constants-r9" in an RRC Connection Setup message, where the rlf-Timers And Constants-r9 information element indicates that the highest protocol version supported by the base station is at least Release 9.

Step 402: Obtain the highest protocol version supported by the base station according to the information element.

Specifically, in this embodiment, step 402 includes:

searching in the air interface message to check whether the information element a specific information element of each protocol version exists, and, if the specific information element exists, using the highest protocol version in protocol versions corresponding to all existent specific information elements as the highest protocol version supported by the base station.

Step 403: Determine whether the highest protocol version supported by the mobile terminal is later than the highest protocol version supported by the base station.

Step 404: If the highest protocol version supported by the mobile terminal is later than the highest protocol version supported by the base station, the mobile terminal configures a protocol version used by the mobile terminal to a protocol version same as the highest protocol version supported by the base station.

Optionally, the method further includes:

Step 405: Receive the request message for querying the mobile terminal capability set sent by the base station.

Step 406: Report a mobile terminal capability set to the base station, where the mobile terminal capability set includes the protocol version used by the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 5

Figure 5:
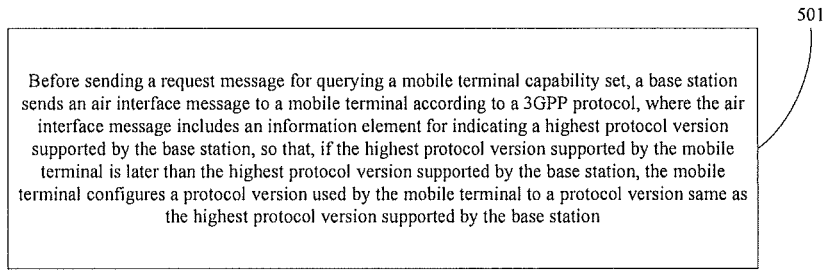
FIG. 5 is a flowchart of a protocol version negotiation method according to Embodiment 5 of the present invention.

Embodiment 5 of the present invention provides a protocol version negotiation method. As shown in FIG. 5, the method includes:

Step 501: Before sending a request message for querying a mobile terminal capability set, a base station sends an air interface message to the mobile terminal according to a 3GPP protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 6

Figure 6:
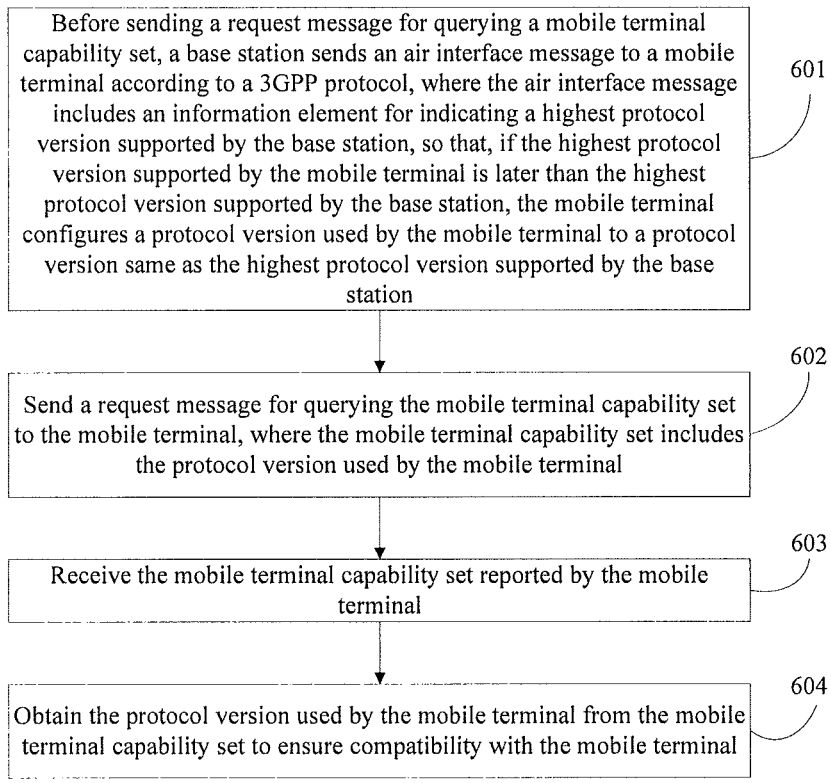
FIG. 6 is a flowchart of a protocol version negotiation method according to Embodiment 6 of the present invention.

Embodiment 6 of the present invention provides a protocol version negotiation method. As shown in FIG. 6, the method includes:

Step 601: Before sending a request message for querying a mobile terminal capability set, a base station sends an air interface message to the mobile terminal according to a 3GPP protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

Optionally, the sending, by a base station before sending a request message for querying the mobile terminal capability set, an air interface message to the mobile terminal according to a 3GPP protocol, where the air interface message includes an information element for indicating a highest protocol version supported by the base station, includes:

sending, by the base station, the air interface message to the mobile terminal, where the air interface message is a system message, the information element is a non-critical extension information element non Critical Extension in the system message, and a predetermined bit in the non-critical extension information element non Critical Extension is used to indicate the highest protocol version number supported by the base station.

Optionally, the sending, by a base station before sending a request message for querying the mobile terminal capability set, an air interface message to the mobile terminal according to a 3GPP protocol, where the air interface message includes an information element for indicating a highest protocol version supported by the base station, includes:

sending, by the base station, an air interface message to the mobile terminal, where the air interface message is an MIB system message, the information element is an information element of reserved bits in the MIB system message, and a predetermined bit in the information element of the reserved bits is used to indicate the highest protocol version number supported by the base station.

Optionally, the method further includes:

Step 602: Send a request message for querying the mobile terminal capability set to the mobile terminal, where the mobile terminal capability set includes the protocol version number used by the mobile terminal.

Step 603: Receive the mobile terminal capability set reported by the mobile terminal.

Step 604: Obtain the protocol version used by the mobile terminal from the mobile terminal capability set to ensure compatibility with the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 7

Figure 7:
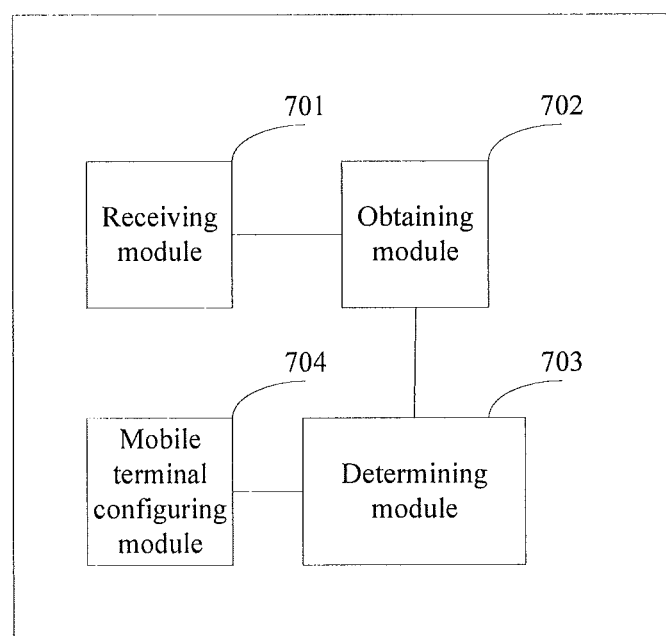
FIG. 7 is a schematic structural diagram of a mobile terminal according to Embodiment 7 of the present invention.

Embodiment 7 of the present invention provides a mobile terminal, which is applicable to a protocol version negotiation method provided in Embodiment 1. As shown in FIG. 7, the mobile terminal includes:

a receiving module 701, configured to receive an air interface message sent by a base station according to a 3GPP protocol, where the air interface message includes an information element for indicating a highest protocol version supported by the base station, and the air interface message is sent before the base station sends a request message for querying a mobile terminal capability set.

an obtaining module 702, configured to obtain the highest protocol version supported by the base station according to the information element in the air interface message received by the receiving module 701;

a determining module 703, configured to determine whether the highest protocol version supported by the mobile terminal is later than the highest protocol version supported by the base station that is obtained by the obtaining module 702; and a mobile terminal configuring module 704, configured to: if a determination result of the determining module 703 is that the highest protocol version supported by the mobile terminal is later than the highest protocol version supported by the base station, configure a protocol version used by the mobile terminal to a protocol version same as the highest protocol version supported by the base station.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 8

Figure 8:
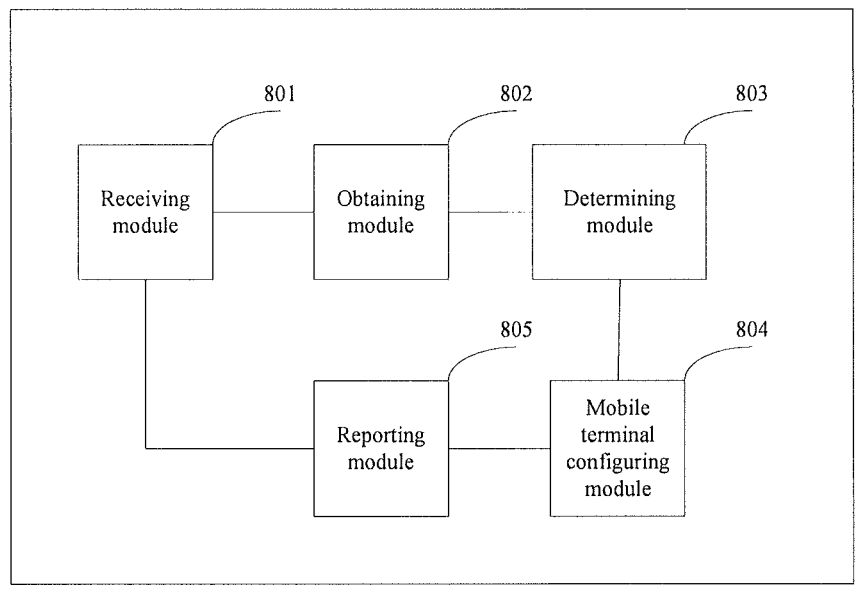
FIG. 8 is a schematic structural diagram of a mobile terminal according to Embodiment 8 of the present invention.

Embodiment 8 of the present invention provides a mobile terminal, which is applicable to a protocol version negotiation method provided in Embodiment 2 to Embodiment 4. As shown in FIG. 8, the mobile terminal includes:

a receiving module 801, configured to receive an air interface message sent by a base station according to a 3GPP protocol, where the air interface message includes an information element for indicating a highest protocol version supported by the base station, and the air interface message is sent before the base station sends a request message for querying a mobile terminal capability set;

an obtaining module 802, configured to obtain the highest protocol version supported by the base station according to the information element in the air interface message received by the receiving module 801;

a determining module 803, configured to determine whether the highest protocol version supported by the mobile terminal is later than the highest protocol version supported by the base station that is obtained by the obtaining module 802; and a mobile terminal configuring module 804, configured to: if a determination result of the determining module 803 is that the highest protocol version supported by the mobile terminal is later than the highest protocol version supported by the base station, configure a protocol version used by the mobile terminal to a protocol version same as the highest protocol version supported by the base station.

Optionally, the air interface message is a system message, the information element is a non-critical extension information element non Critical Extension in the system message, and a predetermined bit in the non-critical extension information element non Critical Extension is used to indicate the highest protocol version supported by the base station; and therefore, the obtaining module 802 is configured to:

read the highest protocol version supported by the base station from the non-critical extension information element non Critical Extension.

Optionally, the air interface message is an MIB system message, the information element is an information element of reserved bits in the MIB system message, and a predetermined bit in the information element of the reserved bits is used to indicate the highest protocol version number supported by the base station; and therefore, the obtaining module 802 is configured to:

read the highest protocol version number supported by the base station from the information element of the reserved bits.

Optionally, the information element is a specific information element of each protocol version in the air interface message; and therefore, the obtaining module 802 is configured to:

search in the air interface message to check whether the information element a specific information element of each protocol version exists, and, if the specific information element exists in the air interface message, use the highest protocol version in protocol versions corresponding to all existent specific information elements as the highest protocol version supported by the base station.

Optionally, the receiving module 801 is further configured to receive the request message for querying the mobile terminal capability set sent by the base station; and correspondingly, the mobile terminal further includes:

a reporting module 805, configured to report a mobile terminal capability set to the base station, where the mobile terminal capability set includes a protocol version number used by the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Figure 9:
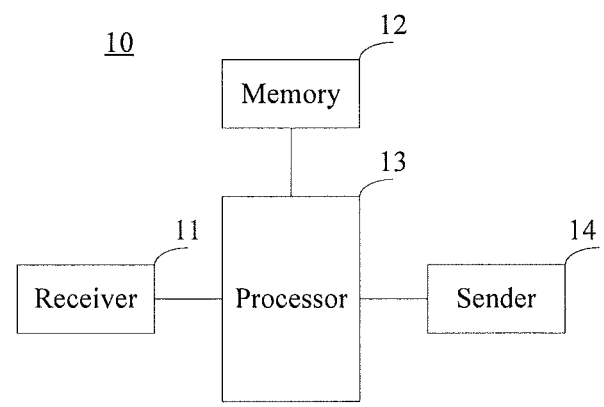
FIG. 9 is a schematic structural diagram of a specific implementation manner of a mobile terminal according to Embodiment 7 and Embodiment 8 of the present invention.

In a specific implementation manner, the mobile terminal in FIG. 7 and FIG. 8 may include a mobile phone, a tablet computer, a PDA (Personal Digital Assistant, personal digital assistant), a POS (Point of Sales, point of sales), or a vehicle-mounted computer, and so on, as shown in FIG. 9. The mobile terminal 10 may include a receiver 11, a memory 12, a processor 13, a sender 14, and other components. A person skilled in the art may understand that the structure shown in FIG. 9 does not constitute any limitation on the mobile terminal, and the mobile terminal may include more or less components than the illustrated components, or certain components may be combined, or different components may be deployed.

The following describes the components of the mobile terminal 10 in detail with reference to FIG. 9:

The receiver 11 may be configured to receive an air interface message sent by a base station according to a 3GPP protocol and a request message for querying the mobile terminal capability set sent by the base station; and the sender 14 may be configured to send the mobile terminal capability set that is reported to the base station.

The memory 12 may be used to store software programs and application modules, and the processor 13 runs the software programs and the application modules stored in the memory 12 to execute various function applications of the mobile terminal 10 and process data. The memory 12 may primarily include a program storage area and a data storage area, where the program storage area may store an operating system, an application program required by at least one function (for example, obtaining the highest protocol version supported by the base station, determining whether the highest protocol version supported by the mobile terminal 10 is later than the highest protocol version supported by the base station, configuring a protocol version used by the mobile terminal 10), and so on; and the data storage area may store data created according to the processing of the mobile terminal 10 (for example, the highest protocol version supported by the base station, and a determination result of determining whether the highest protocol version supported by the mobile terminal 10 is later than the highest protocol version supported by the base station), and so on. In addition, the memory 12 may include a high-speed RAM (Random Access Memory, random access memory), and may further include a non-volatile memory (non-volatile memory), for example, at least one disk memory device, a flash memory device, or another volatile solid-state memory device.

The processor 13 is a control center of the mobile terminal 10, is connected with all parts of the entire mobile terminal 10 by using various interfaces and circuits, and, by running or executing the software programs and/or application modules stored in the memory 12 and by calling the data stored in the memory 12, performs various functions of the mobile terminal 10 and processes the data, so as to perform overall monitoring on the mobile terminal 10.

Specifically, by running or executing the software programs and/or application modules stored in the memory 12 and by calling the data stored in the memory 12, the processor 13 may obtain the highest protocol version supported by the base station according to an information element in the air interface message received by the receiver 11; determine whether the highest protocol version supported by the mobile terminal 10 is later than the highest protocol version supported by the base station; and, if the highest protocol version supported by the mobile terminal 10 is later than the highest protocol version supported by the base station, configure the protocol version used by the mobile terminal 10 to a protocol version same as the highest protocol version supported by the base station.

Embodiment 9

Figure 10:
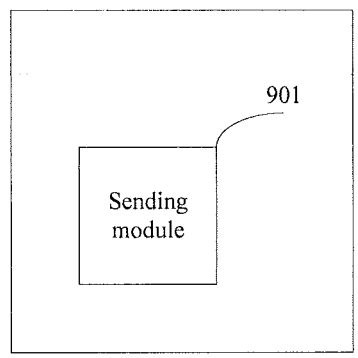
FIG. 10 is a schematic structural diagram of a base station according to Embodiment 9 of the present invention.

Embodiment 9 of the present invention provides a base station, which is applicable to a protocol version negotiation method provided in Embodiment 5. As shown in FIG. 10, the base station includes:

a sending module 901, configured to: before sending a request message for querying a mobile terminal capability set, send an air interface message to a mobile terminal according to a 3GPP protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

Embodiment 10

Figure 11:
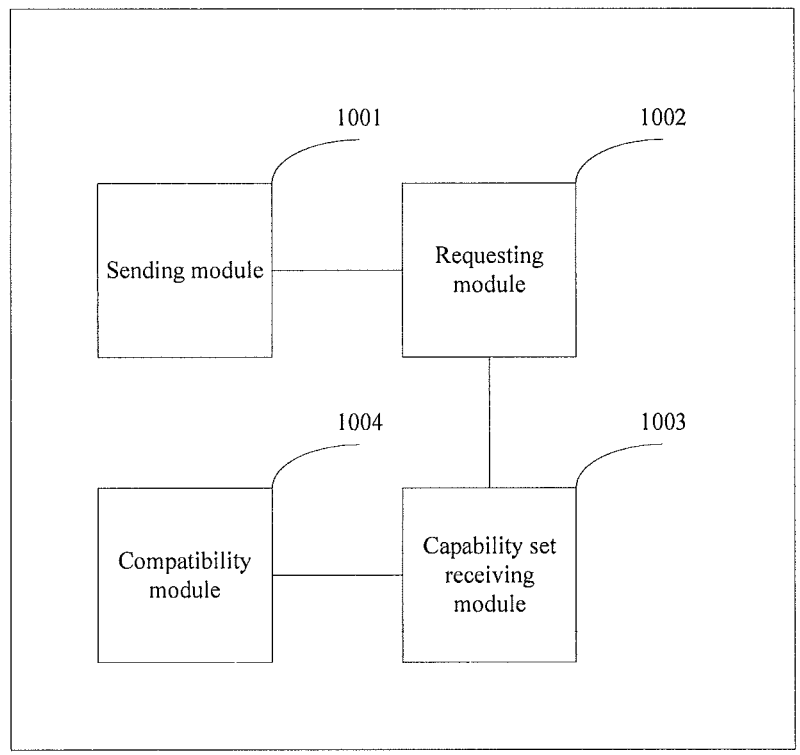
FIG. 11 is a schematic structural diagram of a base station according to Embodiment 10 of the present invention.

Embodiment 10 of the present invention provides a base station, which is applicable to a protocol version negotiation method provided in Embodiment 6. As shown in FIG. 11, the base station includes:

a sending module 1001, configured to: before sending a request message for querying a mobile terminal capability set, send an air interface message to a mobile terminal according to a 3GPP protocol, where the air interface message includes an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station.

Optionally, the sending module 1001 is configured to:

send the air interface message to the mobile terminal, where the air interface message is a system message, the information element is a non-critical extension information element non Critical Extension in the system message, and a predetermined bit in the non-critical extension information element non Critical Extension is used to indicate the highest protocol version supported by the base station.

Optionally, the sending module 1001 is configured to:

send an air interface message to the mobile terminal, where the air interface message is an MIB system message, the information element is an information element of reserved bits in the MIB system message, and a predetermined bit in the information element of the reserved bits is used to indicate the highest protocol version supported by the base station.

Optionally, the base station further includes:

a requesting module 1002, configured to send a request message for querying the mobile terminal capability set to a mobile terminal, where the mobile terminal capability set includes a protocol version used by the mobile terminal;

a capability set receiving module 1003, configured to receive the mobile terminal capability set reported by the mobile terminal; and a compatibility module 1004, configured to obtain the protocol version used by the mobile terminal from the mobile terminal capability set received by the capability set receiving module 1003 to ensure compatibility with the mobile terminal.

In the embodiment of the present invention, before sending a request message for querying the mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

In a specific implementation manner, the base station in FIG. 10 and FIG. 11 may include a sender 21, a memory 22, a processor 23, a receiver 24, and other components. A person skilled in the art may understand that the structure shown in FIG. 12 does not constitute any limitation on the base station, and the base station may include more or less components than the illustrated components, or certain components may be combined, or different components may be deployed.

Figure 12:
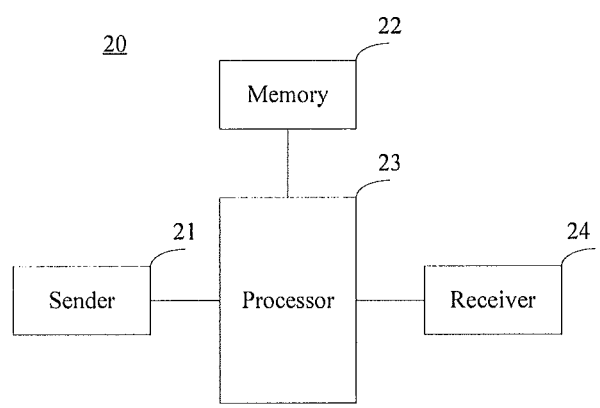
FIG. 12 is a schematic structural diagram of a specific implementation manner of a base station according to Embodiment 9 and Embodiment 10 of the present invention.
Figure 13:
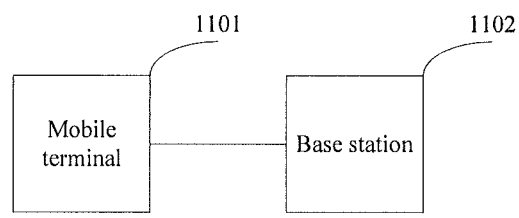
FIG. 13 is a schematic structural diagram of a communications system according to Embodiment 11 of the present invention.

The following describes the components of the base station 20 in detail with reference to FIG. 12:

The sender 21 may be configured to send an air interface message to a mobile terminal according to a 3GPP protocol under control of the processor 23 before sending a request message for querying the mobile terminal capability set.

Further, the sender 21 is further configured to send the request message for querying the mobile terminal capability set to the mobile terminal under control of the processor 23.

The memory 22 may be used to store software programs and application modules, and the processor 23 runs the software programs and the application modules stored in the memory 22 to execute various function applications of the base station 20 and process data. The memory 22 may primarily include a program storage area and a data storage area, where the program storage area may store an operating system, an application program required by at least one function (for example, obtaining the protocol version used by the mobile terminal, and ensuring compatibility with the mobile terminal), and so on; and the data storage area may store data created according to the processing of the base station 20 (for example, a protocol version used by the mobile terminal), and so on. In addition, the memory 22 may include a high-speed RAM (Random Access Memory, random access memory), and may further include a non-volatile memory (non-volatile memory), for example, at least one disk memory device, a flash memory device, or another volatile solid-state memory device.

The processor 23 is a control center of the base station 20, and is connected with all parts of the entire base station 20 by using various interfaces and circuits, and, by running or executing the software programs and/or application modules stored in the memory 22 and by calling the data stored in the memory 22, performs various functions of the base station 20 and processes the data, so as to perform overall monitoring on the base station 20.

Specifically, by running or executing the software programs and/or application modules stored in the memory 22 and by calling the data stored in the memory 22, the processor 23 can obtain the protocol version used by the mobile terminal from the mobile terminal capability set received by the receiver 21 and ensure compatibility with the mobile terminal.

The receiver 24 may be configured to receive the mobile terminal capability set reported by the mobile terminal.

Embodiment 11

This embodiment of the present invention provides a communications system. As shown in FIG. 11, the system includes a mobile terminal 1101 and a base station 1102, where the mobile terminal 1101 is a mobile terminal provided in Embodiment 7 or Embodiment 8, and the base station 1102 is a base station provided in Embodiment 9 or Embodiment 10.

In the embodiment of the present invention, before sending a request message for querying a mobile terminal capability set, a base station sends an air interface message that includes an information element for indicating a highest protocol version supported by the base station, and therefore, a mobile terminal can obtain the highest protocol version supported by the base station from the air interface message, and compare the highest protocol version supported by the mobile terminal with the highest protocol version supported by the base station; and, if the highest protocol version supported by the mobile terminal is later than the highest protocol version supported by the base station, the mobile terminal configures a protocol version used by the mobile terminal to a protocol version same as the highest protocol version supported by the base station, so as to avoid a compatibility problem or even disastrous consequences that occur in the process of interconnection between the mobile terminal and the base station when the highest protocol version supported by the mobile terminal is later than the highest protocol version supported by the base station in the prior art.

It should be noted that: When the mobile terminal and the base station provided in the foregoing embodiments negotiate the protocol version, the classification of the foregoing function modules is used as an example. In practical application, the foregoing functions may be assigned to and performed by different function modules as required, that is, the internal structure of a device is classified into different function modules to perform all or part of the functions described above. In addition, the protocol version negotiation methods provided in the foregoing embodiments are based on the same conception. For the detailed implementation process, see the method embodiment, and the details are not described herein again.

The sequence number of an embodiment of the present invention is for ease of description only, and does not represent priority of the embodiment.

A person of ordinary skill in the art should understand that all or part of the steps of the embodiments may be implemented by hardware or by a program instructing related hardware. The program may be stored in a computer readable storage medium such as a read-only memory, a disk, an optical disc, or the like.

The foregoing descriptions are merely exemplary embodiments of the present invention, but are not intended to limit the present invention. Any modifications, equivalent substitutions, and improvements made within the spirit and principles of the present invention shall fall within the protection scope of the present invention.

What is claimed is:

1. A protocol version negotiation method, comprising:
receiving, by a mobile terminal, an air interface message sent by a base station according to a 3rd Generation Partnership Project protocol, wherein the air interface message comprises an information element for indicating a highest protocol version supported by the base station, and the air interface message is sent before the base station sends a request message for querying a mobile terminal capability set;
obtaining the highest protocol version supported by the base station according to the information element;
determining whether the highest protocol version supported by the mobile terminal is later than the highest protocol version supported by the base station; and if the highest protocol version supported by the mobile terminal is later than the highest protocol version supported by the base station, configuring, by the mobile terminal, a protocol version used by the mobile terminal to a protocol version same as the highest protocol version supported by the base station, wherein the information element of the air interface message includes a number indicating the highest protocol version supported by the base station in one of a system message and a master information block system message.

2. The method according to claim 1, wherein the information element is a specific information element of each protocol version in the air interface message;
therefore, the obtaining the highest protocol version supported by the base station according to the information element comprises:
searching in the air interface message to check whether the specific information element exists, and, if the specific information element exists, using the highest protocol version in protocol versions corresponding to all existent specific information elements as the highest protocol version supported by the base station.

3. The method according to claim 1, further comprising:
receiving the request message for querying the mobile terminal capability set sent by the base station; and
reporting a mobile terminal capability set to the base station, wherein the mobile terminal capability set comprises a protocol version number used by the mobile terminal.

4. A protocol version negotiation method, comprising:
receiving, by a mobile terminal, an air interface message sent by a base station according to a 3rd Generation Partnership Project protocol, wherein the air interface message comprises an information element for indicating a highest protocol version supported by the base station, and the air interface message is sent before the base station sends a request message for querying a mobile terminal capability set;
obtaining the highest protocol version supported by the base station according to the information element;
determining whether the highest protocol version supported by the mobile terminal is later than the highest protocol version supported by the base station; and
if the highest protocol version supported by the mobile terminal is later than the highest protocol version supported by the base station, configuring, by the mobile terminal, a protocol version used by the mobile terminal to a protocol version same as the highest protocol version supported by the base station, wherein the air interface message is a system message, the information element is a non-critical extension information element in the system message, and a predetermined bit in the non-critical extension information element is used to indicate the highest protocol version number supported by the base station; or
the air interface message is a master information block system message, the information element is an information element of reserved bits in the master information block system message, and a predetermined bit in the information element of the reserved bits is used to indicate the highest protocol version number supported by the base station; and
therefore, the obtaining the highest protocol version supported by the base station according to the information element comprises:
reading the highest protocol version number supported by the base station from the non-critical extension information element or the information element of the reserved bits.

5. A protocol version negotiation method, comprising:
sending, by a base station before sending a request message for querying a mobile terminal capability set, an air interface message to a mobile terminal according to a 3rd Generation Partnership Project protocol, wherein the air interface message comprises an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station, wherein the information element of the air interface message includes a number indicating the highest protocol version supported by the base station in one of a system message and a master information block system message.

6. A protocol version negotiation method, comprising:
sending, by a base station before sending a request message for querying a mobile terminal capability set, an air interface message to a mobile terminal according to a 3rd Generation Partnership Project protocol, wherein the air interface message comprises an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station, wherein: the sending, by a base station before sending a request message for querying the mobile terminal capability set, an air interface message to a mobile terminal according to a 3rd Generation Partnership Project protocol, wherein the air interface message comprises an information element for indicating a highest protocol version supported by the base station, comprises:
sending, by the base station, the air interface message to the mobile terminal, wherein the air interface message is a system message, the information element is a non-critical extension information element in the system message, and a predetermined bit in the non-critical extension information element is used to indicate the highest protocol version number supported by the base station; or
sending, by the base station, the air interface message to the mobile terminal, wherein the air interface message is a master information block system message, the information element is an information element of reserved bits in the master information block system message, and a predetermined bit in the information element of the reserved bits is used to indicate the highest protocol version number supported by the base station.

7. A mobile terminal, comprising:
a non-transitory computer-readable storage to store programs(s); and
a processor configured to, including configured by the program(s) to:
receive an air interface message sent by a base station according to a 3rd Generation Partnership Project protocol, wherein the air interface message comprises an information element for indicating a highest protocol version supported by the base station, and the air interface message is sent before the base station sends a request message for querying a mobile terminal capability set;

obtain the highest protocol version supported by the base station according to the information element in the air interface message received by the processor;

determine whether the highest protocol version supported by the mobile terminal is later than the highest protocol version supported by the base station that is obtained by the processor; and if a determination result of the processor is that the highest protocol version supported by the mobile terminal is later than the highest protocol version supported by the base station, configure a protocol version used by the mobile terminal to a protocol version same as the highest protocol version supported by the base station, wherein the information element of the air interface message includes a number indicating the highest protocol version supported by the base station in one of a system message and a master information block system message.

8. The mobile terminal according to claim 7, wherein the information element is a specific information element of each protocol version in the air interface message;

therefore, the processor is configured to:

search in the air interface message to check whether the specific information element exists, and, if the specific information element exists in the air interface message, use the highest protocol version in protocol versions corresponding to all existent specific information elements as the highest protocol version supported by the base station.

9. The mobile terminal according to claim 7, wherein:

the processor is further configured to receive the request message for querying the mobile terminal capability set sent by the base station; and correspondingly, the mobile terminal is further configured to report a mobile terminal capability set to the base station, wherein the mobile terminal capability set comprises the protocol version used by the mobile terminal.

10. A mobile terminal, comprising:

a non-transitory computer-readable storage to store programs(s); and a processor configured to, including configured by the program(s) to:

receive an air interface message sent by a base station according to a 3rd Generation Partnership Project protocol, wherein the air interface message comprises an information element for indicating a highest protocol version supported by the base station, and the air interface message is sent before the base station sends a request message for querying a mobile terminal capability set;

obtain the highest protocol version supported by the base station according to the information element in the air interface message received by the processor;

determine whether the highest protocol version supported by the mobile terminal is later than the highest protocol version supported by the base station that is obtained by the processor; and if a determination result of the processor is that the highest protocol version supported by the mobile terminal is later than the highest protocol version supported by the base station, configure a protocol version used by the mobile terminal to a protocol version same as the highest protocol version supported by the base station, wherein the air interface message is a system message, the information element is a non-critical extension information element in the system message, and a predetermined bit in the non-critical extension information element is used to indicate the highest protocol version supported by the base station; or the air interface message is a master information block system message, the information element is an information element of reserved bits in the master information block system message, and a predetermined bit in the information element of the reserved bits is used to indicate the highest protocol version supported by the base station;

therefore, the processor is configured to:

read the highest protocol version supported by the base station from the non-critical extension information element or the information element of the reserved bits.

11. A base station, comprising:

a non-transitory computer-readable storage to store programs(s); and a processor configured to, including configured by the program(s) to:

before sending a request message for querying a mobile terminal capability set, send an air interface message to a mobile terminal according to a 3rd Generation Partnership Project protocol, wherein the air interface message comprises an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station, wherein the information element of the air interface message includes a number indicating the highest protocol version supported by the base station in one of a system message and a master information block system message.

12. A base station, comprising:

a non-transitory computer-readable storage to store programs(s); and a processor configured to, including configured by the program(s) to:

before sending a request message for querying a mobile terminal capability set, send an air interface message to a mobile terminal according to a 3rd Generation Partnership Project protocol, wherein the air interface message comprises an information element for indicating a highest protocol version supported by the base station, so that, if the highest protocol version supported by the mobile terminal is later than the highest protocol version supported by the base station, the mobile terminal configures a protocol version used by the mobile terminal to a protocol version same as the highest protocol version supported by the base station, wherein the processor is configured to:

send the air interface message to the mobile terminal, wherein the air interface message is a system message, the information element is a non-critical extension information element in the system message, and a predetermined bit in the non-critical extension information element is used to indicate the highest protocol version supported by the base station; or send the air interface message to the mobile terminal, wherein the air interface message is a master information block system message, the information element is an information element of reserved bits in the master information block system message, and a predetermined bit in the information element of the reserved bits is used to indicate the highest protocol version supported by the base station.

\* \* \* \* \*